(12) United States Patent
Morgia, Jr. et al.

(10) Patent No.: US 10,017,049 B2
(45) Date of Patent: Jul. 10, 2018

(54) VENT VALVE, TANK HAVING VENT VALVE, AND METHOD

(71) Applicant: Sikorsky Aircraft Corporation, Stratford, CT (US)

(72) Inventors: James J. Morgia, Jr., Trumbull, CT (US); Giuseppe Alberti, Seymour, CT (US); Adriano Cirioli, North Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 133 days.

(21) Appl. No.: 15/270,134

(22) Filed: Sep. 20, 2016

(65) Prior Publication Data

US 2017/0129327 A1 May 11, 2017

Related U.S. Application Data

(60) Provisional application No. 62/238,374, filed on Oct. 7, 2015.

(51) Int. Cl.
*B60K 15/035* (2006.01)
*B64D 37/16* (2006.01)

(52) U.S. Cl.
CPC .. *B60K 15/03504* (2013.01); *B60K 15/03519* (2013.01); *B64D 37/16* (2013.01); *B60K 2015/0358* (2013.01); *B60K 2015/03576* (2013.01); *Y10T 137/0874* (2015.04)

(58) Field of Classification Search
CPC ........ Y10T 137/0874; Y10T 137/0753; B60K 15/03504; B60K 15/03519; B60K 2015/0358; B64D 37/16

USPC .......................................................... 137/43
See application file for complete search history.

(56) References Cited

U.S. PATENT DOCUMENTS

| | | | |
|---|---|---|---|
| 3,916,928 A | 11/1975 | Enoch | |
| 4,760,858 A * | 8/1988 | Szlaga | B60K 15/03519 137/43 |
| 5,181,497 A * | 1/1993 | Matsushita et al. | B60K 15/03519 123/520 |
| 5,388,545 A | 2/1995 | Escarrat | |
| 5,782,258 A | 7/1998 | Hebron et al. | |
| 5,894,966 A * | 4/1999 | Bobey et al. | A61G 7/015 137/223 |
| 5,927,315 A * | 7/1999 | Kim | B60K 15/03519 137/202 |
| 6,439,506 B1 | 8/2002 | Schlegel et al. | |

(Continued)

*Primary Examiner* — Kevin Lee
(74) *Attorney, Agent, or Firm* — Cantor Colburn LLP

(57) ABSTRACT

A vent valve includes a vent body including an outlet and at least one inlet, a main chamber, a main closable device movable from an open position to allow fluidic communication between the main chamber and the outlet, to a closed position to block fluidic communication between the main chamber and the outlet, and a first tubing having a first end and a second end, the first end connected to a first inlet, the second end spaced from the vent body, the first tubing further including a first closable device adjacent the second end. The first closable device allows fluidic communication between an exterior of the first tubing and an interior of the first tubing in a first orientation of the vent valve, and blocks fluidic communication between the exterior of the first tubing and the interior of the first tubing in a second orientation of the vent valve.

20 Claims, 4 Drawing Sheets

(56) References Cited

U.S. PATENT DOCUMENTS

| | | |
|---|---|---|
| 7,287,542 B2 | 10/2007 | Allman et al. |
| 8,485,215 B2 | 7/2013 | Arnalsteen et al. |
| 2015/0176716 A1 | 6/2015 | Beeson |

* cited by examiner

VENT VALVE, TANK HAVING VENT VALVE, AND METHOD

CROSS REFERENCE TO RELATED APPLICATIONS

This application claims the benefit of an earlier filing date from U.S. Provisional Application Ser. No. 62/238,374 filed Oct. 7, 2015, the entire disclosure of which is incorporated herein by reference.

BACKGROUND

Aircraft may land onboard ships for service and refueling. During pressure fueling of an aircraft when the ship is pitching and rolling, the present normally-open vent valves in the fuel tank can close and stay closed. On existing valves, once the valves close, they tend to stay closed because any sort of pressure that builds up within the fuel tank works to retain the valves in a closed condition. This potentially can cause an overpressure condition of the fuel tank sponson during pressure fueling that can damage the sponson and ground the aircraft, potentially aborting a mission.

Accordingly, there exists a need in the art for a fuel vent in a fuel tank that can continue to vent during pitching and rolling conditions.

BRIEF DESCRIPTION

A vent valve includes a vent body including an outlet and at least one inlet, a main chamber within the vent body, a main closable device movable from an open position to allow fluidic communication between the main chamber and the outlet, to a closed position to block fluidic communication between the main chamber and the outlet, and a first tubing having a first end and a second end, the first end connected to a first inlet amongst the at least one inlet, the second end spaced from the vent body, the first tubing further including a first closable device adjacent the second end. The first closable device allows fluidic communication between an exterior of the first tubing and an interior of the first tubing in a first orientation of the vent valve, and blocks fluidic communication between the exterior of the first tubing and the interior of the first tubing in a second orientation of the vent valve.

In addition to one or more of the features described above or below, or as an alternative, further embodiments could include a first cage and a first caged ball.

In addition to one or more of the features described above or below, or as an alternative, further embodiments could include the first caged ball having a first caged ball diameter, the first cage including a tubing entrance having a smaller diameter than the first caged ball diameter, and the first caged ball blocking the tubing entrance in the second orientation of the fuel vent valve.

In addition to one or more of the features described above or below, or as an alternative, further embodiments could include the second end of the first tubing at a non-zero angle relative to the first end of the first tubing.

In addition to one or more of the features described above or below, or as an alternative, further embodiments could include the first tubing including an elbow, and the first closable device between the elbow and the second end of the first tubing.

In addition to one or more of the features described above or below, or as an alternative, further embodiments could include a second tubing having a first end and a second end, the first end of the second tubing connected to a second inlet amongst the at least one inlet, the second end of the second tubing spaced from the vent body.

In addition to one or more of the features described above or below, or as an alternative, further embodiments could include a second closable device adjacent the second end of the second tubing, wherein the second closable device allows fluidic communication between an exterior of the second tubing and an interior of the second tubing in a first orientation of the fuel vent valve, and the second closable device allows fluidic communication between the exterior of the second tubing and the interior of the second tubing in the second orientation of the fuel vent valve.

In addition to one or more of the features described above or below, or as an alternative, further embodiments could include the second closable device blocking fluidic communication between the exterior of the second tubing and the interior of the second tubing in a third orientation of the fuel vent valve, and the first closable device allowing fluidic communication between the exterior of the first tubing and the interior of the first tubing in the third orientation of the fuel vent valve.

In addition to one or more of the features described above or below, or as an alternative, further embodiments could include the second inlet substantially opposite the first inlet in the vent body.

In addition to one or more of the features described above or below, or as an alternative, further embodiments could include a plunger as the main closable device, and further include a crash ball disposed within the main chamber, the plunger movable from the open position to the closed position by engagement of the crash ball with the plunger.

In addition to one or more of the features described above or below, or as an alternative, further embodiments could include a screen enclosing a portion of the main chamber and the plunger and enclosing the crash ball within the main chamber.

In addition to one or more of the features described above or below, or as an alternative, further embodiments could include a spring configured to bias the plunger to the open position.

In addition to one or more of the features described above or below, or as an alternative, further embodiments could include the vent body including a first end having the outlet, and a second end opposite the first end, the fuel vent valve further including a float drain at the second end of the vent body.

A fuel tank includes a fuel tank body; a fuel vent valve fixed relative to the fuel tank body, the fuel vent valve disposed within an interior of the fuel tank body, the fuel vent valve including a vent body including an outlet and at least one inlet, a main chamber within the vent body, a main closable device movable from an open position to allow fluidic communication between the main chamber and the outlet, to a closed position to block fluidic communication between the main chamber and the outlet, and a first tubing having a first end and a second end, the first end connected to a first inlet amongst the at least one inlet, the second end spaced from the vent body, the first tubing further including a first closable device adjacent the second end. The first closable device allows fluidic communication between the interior of the fuel tank and an interior of the first tubing in a first orientation of the fuel tank, and blocks fluidic communication between the interior of the fuel tank and the interior of the first tubing in a second orientation of the fuel tank. Piping extends from the outlet of the vent body to an exterior of the fuel tank body, and a portion of the plunger extends within the piping, and the second end of the first tubing is disposed above a fill line of the fuel tank within the interior of the fuel tank body.

In addition to one or more of the features described above or below, or as an alternative, further embodiments could include a second tubing having a first end and a second end, the first end of the second tubing connected to a second inlet amongst the at least one inlet, the second end of the second tubing spaced from the vent body, the second tubing further including a second closable device adjacent the second end of the second tubing, wherein the second closable device allows fluidic communication between the interior of the fuel tank and an interior of the second tubing in a first orientation of the fuel tank, and the second closable device allows fluidic communication between the interior of the fuel tank and the interior of the second tubing in the second orientation of the fuel tank.

In addition to one or more of the features described above or below, or as an alternative, further embodiments could include the second closable device blocking fluidic communication between the interior of the fuel tank and the interior of the second tubing in a third orientation of the fuel tank, and the first closable device allowing fluidic communication between the interior of the fuel tank and the interior of the first tubing in the third orientation of the fuel tank.

A method of venting a fuel tank, the fuel tank having a fuel tank body, includes securing a fuel vent valve within an interior of the fuel tank body, the fuel vent valve comprising a vent body including an outlet and at least one inlet; a main chamber within the vent body; a main closable device movable from an open position to allow fluid communication between the main chamber and the outlet, to a closed position to block fluidic communication between the main chamber and the outlet; and, a first tubing having a first end and a second end, the first end connected to a first inlet amongst the at least one inlet, the second end spaced from the vent body, the first tubing further including a first closable device adjacent the second end; retaining the first closable device in an open position in a first orientation of the fuel tank to allow fluidic communication between the interior of the fuel tank and an interior of the first tubing; and, moving the first closable device to a closed position in a second orientation of the fuel tank to block fluidic communication between the interior of the fuel tank body and the interior of the first tubing.

In addition to one or more of the features described above or below, or as an alternative, further embodiments could include moving the main closable device to the closed position of the main closable device when the fuel tank is greater than about 50 degrees from vertical.

In addition to one or more of the features described above or below, or as an alternative, further embodiments could include a second tubing having a first end and a second end, the first end of the second tubing connected to a second inlet amongst the at least one inlet, the second end of the second tubing spaced from the vent body, the second tubing further including a second closable device adjacent the second end of the second tubing, the method further including: retaining the second closable device in an open position in the first orientation of the fuel tank to allow fluidic communication between the interior of the fuel tank and an interior of the second tubing; and, retaining the second closable device in the open position of the second closable device in the second orientation of the fuel tank to allow fluidic communication between the interior of the fuel tank and the interior of the second tubing.

In addition to one or more of the features described above or below, or as an alternative, further embodiments could include moving the second closable device to a closed position in a third orientation of the fuel tank to block fluidic communication between the interior of the fuel tank and the interior of the second tubing; and, retaining the first closable device in the open position of the first closable device in the third orientation of the fuel tank to allow fluidic communication between the interior of the fuel tank and the interior of the first tubing.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
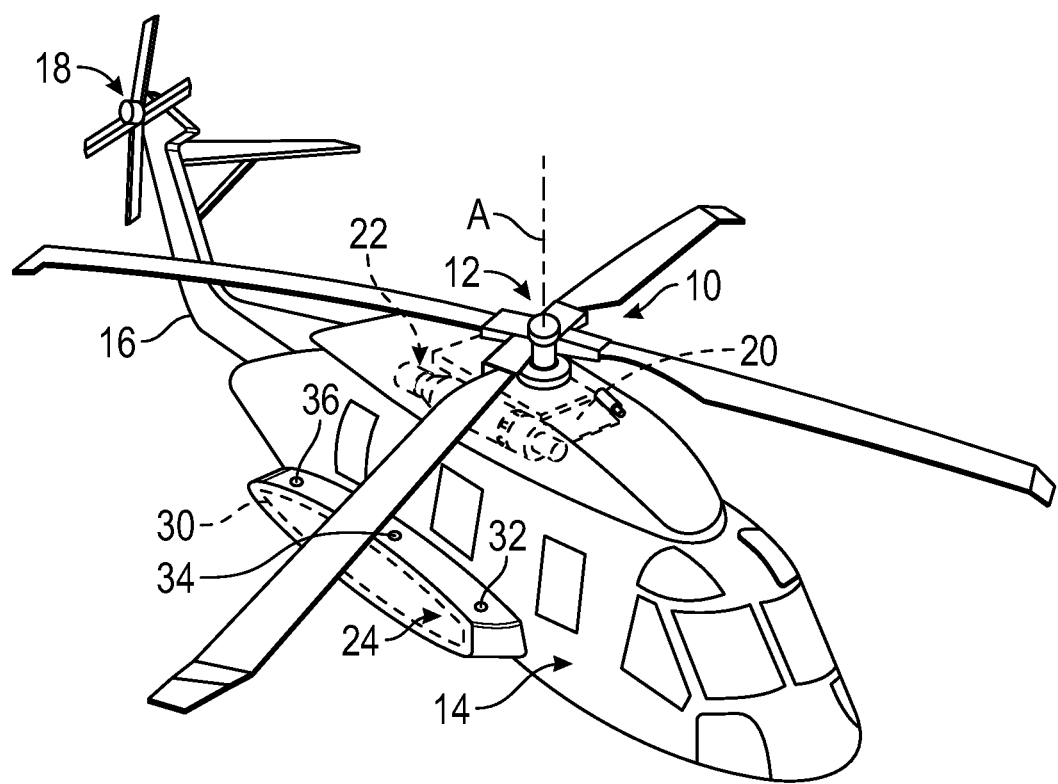
FIG. 1 is a perspective view of an embodiment of a rotary wing aircraft vehicle.

FIG. 1 schematically illustrates a vehicle 10, such as a rotary-wing aircraft, having a main rotor assembly 12. The embodiment of vehicle 10 includes an airframe 14 having an extending tail 16 that mounts an anti-torque system 18. The main rotor assembly 12 is driven about an axis of rotation A through a main rotor gearbox 20 by a multi-engine powerplant system 22, here having two engine packages, although any number of engine packages may be included. The multi-engine powerplant system 22 is integrated with the main rotor gearbox 20, which drives the main rotor assembly 12 and the anti-torque system 18. Sponsons 24 are mounted on respective port and starboard sides of the airframe 14, and each sponson 24 includes one or more fuel tanks 30. Each fuel tank 30 may be crashworthy, self-sealing, interchangeable and generally contain a pressure refuel/defuel valve, fuel quantity sensors, low-level sensors, high-level shutoff valves, low-level shutoff valves, check valves, sump drains, as well as other fuel communicate components. In one embodiment of the sponson 24, three vent valves are provided—a forward vent valve 32, an aft vent valve 36, and a center vent valve 34. Although a particular rotary-wing aircraft configuration of a vehicle 10 is illustrated and described in the disclosed embodiment, other vehicles, configurations, equipment, anchor machines, such as high speed compound rotary wing aircrafts with supplemental translational thrust systems, dual contra-rotating, coaxial rotor system aircrafts, tilt-rotors and tilt-wing aircrafts, and fixed wing aircrafts, as well as land and other equipment, machines, and vehicles having fuel tanks, may also benefit from embodiments of a fuel tank and fuel tank valve described herein. Also, while the sponson 24 is illustrated as having three vent valves 32, 34, 36, more or less vent valves may be provided and in alternate locations.

Figure 2:
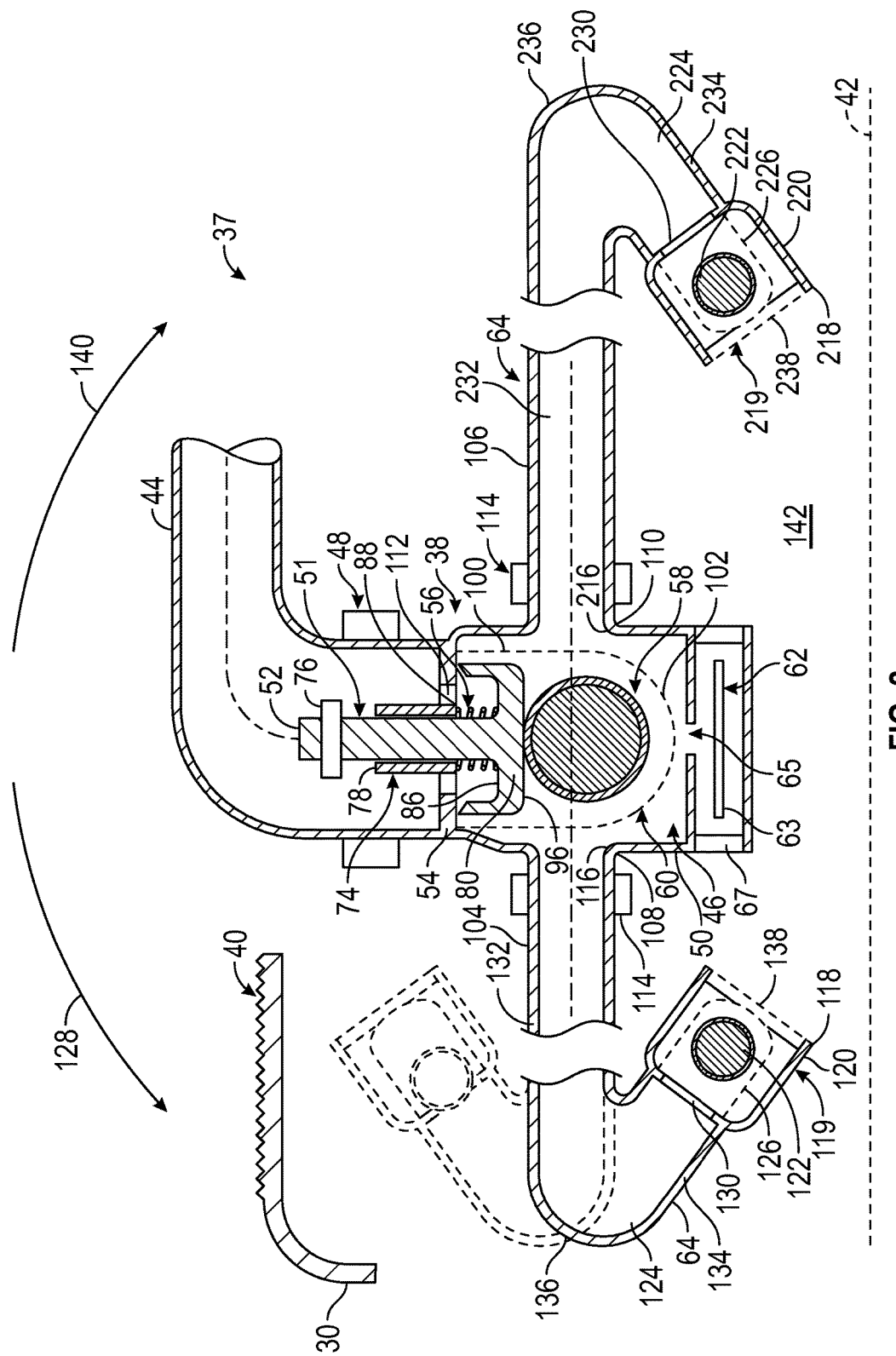
FIG. 2 is a sectional and partial view of an embodiment of a vent valve usable in at least one location of a fuel tank, with a main closable device in an open condition.
Figure 3:
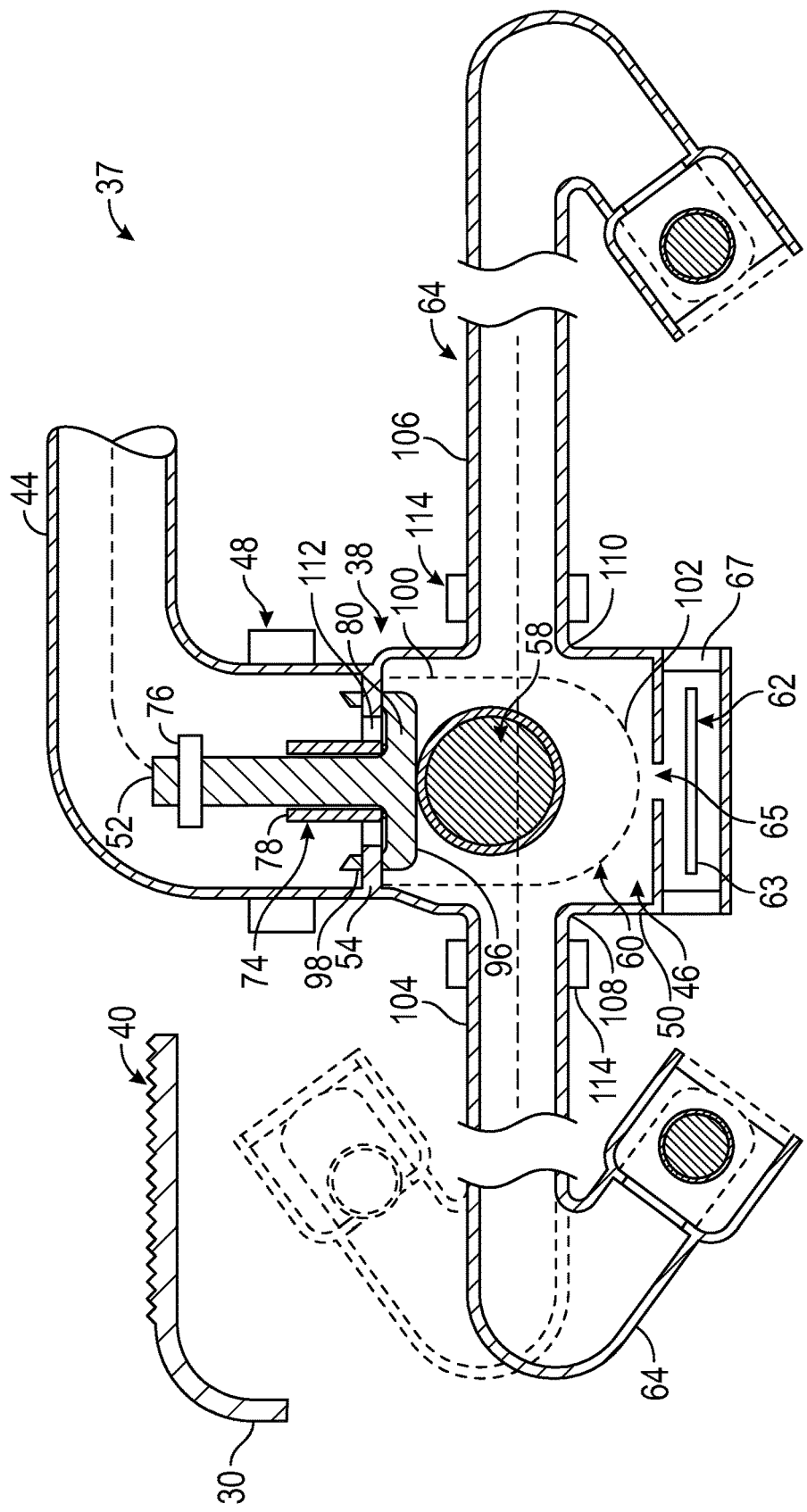
FIG. 3 is a sectional and partial view of an embodiment of a vent valve usable in at least one location of a fuel tank, with a main closable device in a closed condition.
Figure 6:
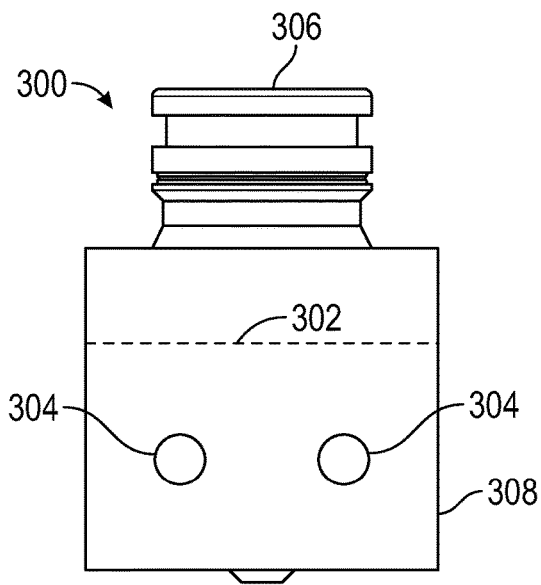

A vent valve 38 usable in the sponson 24 for a vent system 37 is shown in FIGS. 2 and 3. In one embodiment of the vehicle 10, the vent valve 38 may be employed as a center vent valve 34. While all three vent valves 32, 34, 36 may utilize embodiments of the vent valve 38 depicted in FIGS. 2 and 3, in one embodiment, only the center vent valve 34 is replaced by vent valve 38. The center vent valve 34 is the highest valve in the sponson 24, and generally the easiest to access from a maintenance perspective, and therefore retrofitting only the center vent valve 34 of current sponson fuel tanks 30 with the vent valve 38 shown in FIG. 2 allows for a simple solution to maintain venting during pressure fueling, without incurring the added expense of replacing all the vent valves 32, 34, 36. As shown in FIG. 6, the forward and aft vent valves 32, 36 may utilize simpler vent valves 300 that include inlets 304 and an outlet 306, and that close when fuel ascends to a certain level, as demonstrated by line 302. However, if the closure is due to pitching and rolling of a ship, when the fuel drains, the remaining pressure in the valve body 308 and fuel tank 30 may cause the valves 300 to stay closed. Thus, the vent valves 38 are designed to remain open even during pitching and rolling, to assure continuous venting during pressure fueling in a pitching and rolling scenario.

The fuel vent valve 38 may be positioned on the sponson 24 for venting the fuel tank 30 during pressure fueling. A portion of the bladder 40 of the fuel tank 30 is depicted, and the fuel vent valve 38 is fixedly secured within the fuel tank 30, and with respect to the fuel tank 30, to rest above a normal fuel tank fill line, represented by dashed line 42. Venting that occurs through the fuel vent valve 38 is important to prevent over pressurization, which could cause damage to the sponsons 24. The embodiment of the vent valve 38 is provided to prevent closure of the vent valve 38 in a pitching and rolling environment when the vehicle 10 has landed on a ship for refueling. For example, the ship can be subject to as much as 45 degrees of roll off the vertical with up to 28 degrees as typical. The vent valve 38 in FIG. 2 is depicted in an open configuration, such that fluidic communication between a vent line 44 extending from the fuel tank 30 in the sponson 24 and a main chamber 46 of the vent valve 38 is allowed, even during pitching and rolling. In one embodiment, the fuel vent valve 38 may remain open up to about 50 degrees from vertical. That is, in such an embodiment, at greater than about 50 degrees from vertical, the vent valve 38 would close, such as depicted in FIG. 3.

Features of one embodiment of the vent valve 38 may include a metal seal flexible coupling 48 to connect the vent valve 38 to the fuel tank 30, a vent valve body 50 defining the main chamber 46, a main closable device 51 such as a non-buoyant plunger 52 passing through a vent disk 54 and into the main chamber 46, a biasing device such as spring 56 between the plunger 52 and the vent disk 54, a closing actuator such as crash ball 58, a screen 60 within the main chamber 46, a float drain 62, and vent tubing 64.

Figure 4:
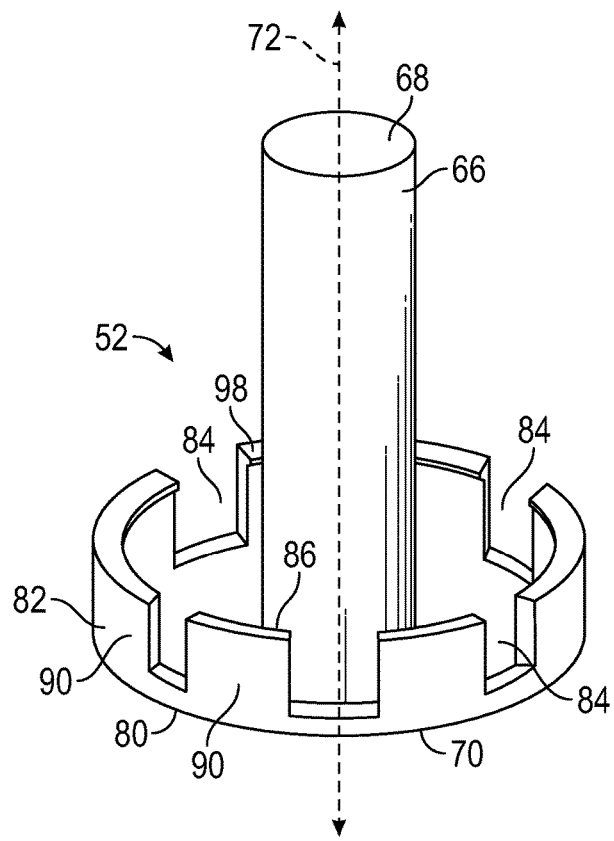
FIG. 4 is a perspective view of an embodiment of a plunger for use in the vent valve of FIGS. 2 and 3.
Figure 5:
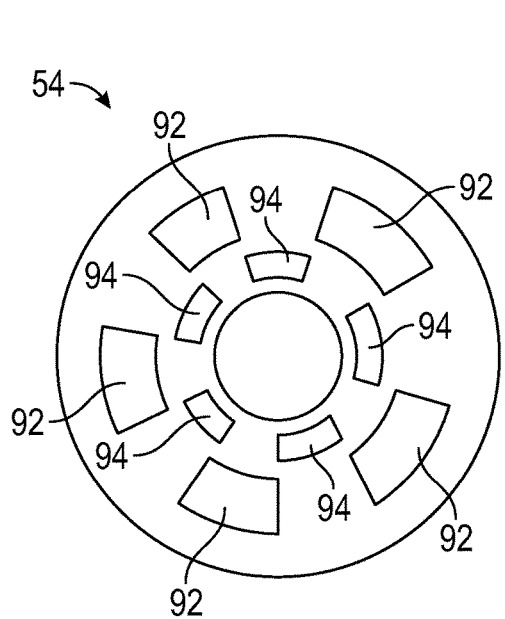
FIG. 5 is a plan view of an embodiment of a vent disc for use in the vent valve of FIGS. 2 and 3; and, FIG. 6 is a side view of another embodiment of a vent valve for the fuel tank.

With additional reference to FIG. 4, one example embodiment of the plunger 52 may be made of metal for non-buoyancy. The plunger 52 may further include a longitudinal portion 66 having a first end 68 operatively disposed outside of the main chamber 46, and a second end 70 operatively disposed within the main chamber 46. The longitudinal portion 66 slides longitudinally, along longitudinal axis 72 within a guide 74 (FIGS. 2 and 3) that extends between the vent disk 54 and the longitudinal portion 66 of the plunger 52. The guide 74 is configured to preclude jamming. A nut 76 (FIGS. 2 and 3) may be positioned on the longitudinal portion 66, adjacent the first end 68, to prevent the plunger 52 from falling into the main chamber 46 by abutting with a first end 78 of the guide 74. Alternatively, the longitudinal portion 66 may be machined to have a shoulder portion that abuts with the first end 78 of the guide 74. The plunger 52 may further include a face portion 80 operatively disposed within the main chamber 46. The face portion 80 is attached to (or integrally formed with) the second end 70 of the longitudinal portion 66, and has a larger diameter than a diameter of the longitudinal portion 66. The face portion 80 is large enough to interact with the crash ball 58. The plunger 52 may further include a side portion 82 extending from peripheral edges of the face portion 80. The face portion 80 may be at least substantially imperforate so that when the plunger 52 is in the closed position, as shown in FIG. 3, fluidic communication between the main chamber 46 and the vent line 44 is blocked by the face portion 80 covering any apertures in the vent disk 54. However, side portion 82 of the plunger 52 includes any number of apertures, holes, grooves, or other venting gaps 84 around the perimeter of the plunger 52 so that when the plunger 52 is in the open position, as shown in FIG. 2, fluidic communication between the main chamber 46 and the vent line 44 extending from the vent valve 38 is allowed. The venting gaps 84 of the plunger 52 (FIG. 4) may be separated by side portion fingers 90 that are receivable within receiving apertures 92 in the vent disk 54 as shown in FIG. 5. The vent disk 54 may further include any number of venting apertures or holes 94 so that when the receiving apertures 92 are occupied by the side portion fingers 90, but the plunger 52 is still in the open position, fluidic communication is still allowed between the main chamber 46 and the vent line 44 via the venting gaps 84 in the plunger 52 and the venting holes 94 in the vent disk 54. The vent disk 54 is positioned at an outlet 112 of the vent body 50 (as shown in FIGS. 2 and 3).

With reference again to FIG. 2, the spring 56 is positioned between a first side 86 of the face portion 80 and the vent disk 54, or between the first side 86 of the face portion 80 and a second end 88 of the guide 74. The spring 56 biases the face portion 80 of the plunger 52 away from the vent disk 54 so that fluidic communication is allowed between the main chamber 46 and the vent line 44 through the venting holes 94. However, during a crash event, or when the fuel tank 30 is positioned at a large pre-selected angle, such as, but not limited to, greater than 50 degrees from vertical, in order to prevent any fuel from escaping through the vent line 44, the crash ball 58 will engage with the second side 96 of the face portion 80 and push the face portion 80 against its bias towards the vent disk 54. The side portion fingers 90 of the plunger 52 will push through the receiving apertures 92 such that the non-apertured face portion 80 of the plunger 52 faces the main chamber 46 and blocks fluidic communication between the venting holes 94 and the main chamber 46. Thus, in this scenario, the vent valve 38 is closed, as shown in FIG. 3. When the crash ball 58 rolls off of the face portion 80, the plunger 52 may return to its biased open position to vent the fuel tank 30. Alternatively, the vent valve 38 may remain closed in a crash condition. In such an embodiment, the side portion fingers 90 of the plunger 52 may include biased latching ends 98 (FIG. 3) such that when the plunger 52 is moved towards the fully closed position, the latching ends 98 are hooked onto the vent disk 54 adjacent the receiving apertures 92. With the latching ends 98 secured thereto, the plunger 52 remains closed so that no fuel may leak therethrough in the event of a crash, even if the crash ball 58 rolls off of the face portion 80.

The screen 60 encloses the crash ball 58 between the screen 60 and the face portion 80 of the plunger 52. In one embodiment, the screen 60 extends in the main chamber 46 from the vent disk 54 and screens in a space within the main chamber 46 large enough for the crash ball 58 to roll within and engage with the face portion 80. Also in one embodiment, the screen 60 includes a cylindrical portion 100 integrated with a dome portion 102 as shown. The dome portion 102 may be adjacent the float drain 62. The screen 60 permits fluid communication between the tubing 64 and the main chamber 46, as well as between the main chamber 46 outside of the space enclosed by the screen 60 and the side portion 80 of the plunger 52. The main chamber 46 is also in fluidic communication with the float drain 62. If fuel manages to become trapped in the main chamber 46 from the tubings 64, the float drain 62 can release the fuel from the main chamber 46, via opening 65 at the bottom of the main chamber 46 and side openings 67 at the sides and/or bottom of the float drain 62, without letting any additional fuel into the main chamber 46. The float drain 62 includes a float disc 63 therein such that if there is a surge of fuel towards the vent body 50, the float disc 63, which may be buoyant with respect to the fuel, will close the opening 65 to the main chamber 46, thus prohibiting the entry of fuel into the main chamber 46 through the float drain 62.

The tubing 64 includes at least first and second tubings 104, 106 attached respectively to at least first and second inlets 108, 110 of the vent body 50, such as by nuts 114. Each tubing 104, 106 may, in one embodiment, extend towards an opposite lateral corner of the fuel tank 30. First tubing 104 includes a first end 116 connected to the first inlet 108, a second end 118 spaced from the vent body 50, and a first closable device 119. In one embodiment, the first closable device 119 includes a first cage 120 adjacent the second end 118, and a first caged ball 122 trapped by the first cage 120 from exiting the second end 118 and from further entry into an interior 124 of the first tubing 104. The first tubing 104 further includes a first portion 132 extended from the first end 116, a second portion 134 extended towards the second end 118, and an elbow or intermediate bend portion 136 interposed between the first and second portions 132, 134. Because the first portion 132 may be longer in proportion to the second portion 134, the first portion 132 is shown partially. For example, the first portion 132 may extend a foot or more from the vent body 50. In a first orientation of the vent valve 38, such as a normal orientation where a ship is not pitched or rolled, the first caged ball 122 permits fluidic communication between the first cage 120 and the interior 124 of the first tubing 104. This may occur by providing the first caged ball 122 within a screen 126, and/or by providing the second end 118 with a number of apertures 138, all of which are smaller in diameter or dimension than a diameter of the first caged ball 122, but not all of which are blocked by the first caged ball 122 in the first orientation. However, when the fuel tank 30 (and thus the vent valve 38) is moved (such as by a ship) to a second orientation, such as in rolling direction 128 by a number of degrees it takes for second end 118 to be submerged in fuel or other liquid 43, the first caged ball 122 will seat within a tubing entrance 130, having a smaller diameter than the diameter of the first caged ball 122, and block fluidic communication between the first cage 120 and the interior 124 of the first tubing 104. This is helpful in preventing fuel in the fuel tank 30 from entering the first inlet 108. A portion of the first tubing 104 is shown in phantom to demonstrate the first caged ball 122 seated within the tubing entrance 130. When the fuel tank 30 (and thus the vent valve 38) is moved (such as by a ship) to a third orientation, such as in rolling direction 140, the first caged ball 122 will move away from the tubing entrance 130, thus enabling fluidic communication between an interior 142 of the fuel tank 30 and the interior 124 of the first tubing 104.

Similarly, the second tubing 106 includes a first end 216 connected to the second inlet 110, a second end 218 spaced from the vent body 50, and a second closable device 219. In one embodiment, the second closable device 219 may include a second cage 220 adjacent the second end 218, and a second caged ball 222 trapped by the second cage 220 from exiting the second end 218 and from further entry into an interior 224 of the second tubing 106. The second tubing 106 further includes a first portion 232 extended from the first end 216, a second portion 234 extended towards the second end 218, and an elbow or intermediate bend portion 236 interposed between the first and second portions 232, 234. In a first orientation of the vent valve 38, such as a normal orientation where the ship is not pitched or rolled, the second caged ball 222 permits fluidic communication between the second cage 220 and the interior 224 of the second tubing 106. This may occur by providing the second caged ball 222 within a screen 226, and/or by providing the second end 218 with a number of apertures 238, all of which are smaller in diameter or dimension than a diameter of the second caged ball 222, but not all of which are blocked by the second caged ball 222 in the first orientation. However, when the fuel tank 30 (and thus the vent valve 38) is moved (such as by a ship) to the third orientation, such as in rolling direction 140 by a number of degrees it takes for second end 218 to be submerged in fuel or other liquid 43, the second caged ball 222 will seat within a tubing entrance 230, having a smaller diameter than the diameter of the second caged ball 222, and block fluidic communication between the second cage 220 and the interior 224 of the second tubing 106. This is helpful in preventing fuel in the fuel tank 30 from entering the second inlet 110. When the fuel tank 30 (and thus the vent valve 38) is moved (such as by a ship) to the second orientation, such as in rolling direction 128, the second caged ball 222 will move away from the tubing entrance 230, thus enabling fluidic communication between the interior 142 of the fuel tank 30 and the interior 224 of the second tubing 106.

In each of the first and second tubings 104, 106, the second ends 118, 218 are disposed at non-zero angles with respect to the first ends 116, 216. That is, while the first portions 132, 232 extend away from the vent valve body 50 towards the bend portions 136, 236, the second portions 134, 234 may extend partially back towards the vent valve body 50 from the bend portions 136, 236. The second ends 118, 218 are thus facing inwardly towards the interior 142 of the fuel tank 30 and towards fuel line 42 of the fuel 43 for maximum venting ability. The first and second tubings 104, 106 are generally circuitous to discourage any fuel that may enter the first and second tubings 104, 106 from finding its way through the first and second inlets 108, 110 and into the main chamber 46. While first and second tubings 104, 106 have been disclosed, additional tubings may be incorporated and attached to other radially dispersed inlets. For example, tubings may be provided on opposite sides between the first and second tubings 104, 106 to protect against fuel vent closures during pitching orientations. Alternatively, a vent valve 38 may be provided with a single tubing 64 positioned anywhere radially along the vent body 50 as needed. In one embodiment, the first and second tubings 104, 106 may include lightweight aluminum tubes. Also, while first and second closable devices 119, 219 have been described as including caged balls 122, 222, other closable devices such as flapper valves, sliding sleeves, etc. may be incorporated therein.

Embodiments of the vent valve 38 while depicted as incorporating a roll-over steel ball bearing feature (crash ball 58), may alternatively incorporate a self-sealing breakaway valve for crash. The vent body 50 also incorporates the float drain 62 to allow any residual fuel and a float seal to preclude any nuisance leaks. In the illustrated embodiment, the inlets 108, 110 to the vent body 50 are connected to the tubing 104, 106 that extend to the top lateral corners of the fuel tank 30 (above the full fuel line 42) allowing at least one of the second ends 118, 218 to always be exposed to air (or the gas inside the fuel tank 30) in pitching and rolling motion. That is, even if one of the second ends 118, 218 is submerged in the fuel 43, the other end 118, 218 will not be. The valve 38 remains open unless in a crash event. The tubings 104, 106 incorporate a circuitous path to preclude fuel from being expelled through the vent outlet 112 and outboard of the sponson 24. In one embodiment, each tubing 104, 106 may incorporate a steel ball bearing (first and second caged balls 122, 222) that allow each second end 118, 218 to be normally open but close in pitch and roll as required. In a crash, if the tubings 104, 106 are severed, the crashworthiness of the fuel tank 30 is not compromised, as the main closable device 51 will still block the outlet 112.

The vent system 37 does not reduce useable fuel quantity and will allow the operator to fill the tank 30 to full (fill line 42) without risk of tank rupture or nuisance leaks. The design of the vent system 37 does not require additional crash drop testing and the vent system 37 can be installed without any personnel entering the tank 30.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A vent valve including:
    a vent body including an outlet and at least one inlet;
    a main chamber within the vent body;
    a main closable device movable from an open position to allow fluidic communication between the main chamber and the outlet, to a closed position to block fluidic communication between the main chamber and the outlet; and,
    a first tubing having a first end and a second end, the first end connected to a first inlet amongst the at least one inlet, the second end spaced from the vent body, the first tubing further including a first closable device adjacent the second end, wherein the first closable device allows fluidic communication between an exterior of the first tubing and an interior of the first tubing in a first orientation of the vent valve, and blocks fluidic communication between the exterior of the first tubing and the interior of the first tubing in a second orientation of the vent valve.

2. The vent valve of claim 1, wherein the first closable device includes a first cage and a first caged ball.

3. The vent valve of claim 2, wherein the first caged ball has a first caged ball diameter, the first cage includes a tubing entrance having a smaller diameter than the first caged ball diameter, and the first caged ball blocks the tubing entrance in the second orientation of the fuel vent valve.

4. The vent valve of claim 1, wherein the second end of the first tubing is at a non-zero angle relative to the first end of the first tubing.

5. The vent valve of claim 4, wherein the first tubing includes an elbow, and the first closable device is between the elbow and the second end of the first tubing.

6. The vent valve of claim 1, further comprising a second tubing having a first end and a second end, the first end of the second tubing connected to a second inlet amongst the at least one inlet, the second end of the second tubing spaced from the vent body.

7. The vent valve of claim 6, wherein the second tubing further includes a second closable device adjacent the second end of the second tubing, wherein the second closable device allows fluidic communication between an exterior of the second tubing and an interior of the second tubing in a first orientation of the fuel vent valve, and the second closable device allows fluidic communication between the exterior of the second tubing and the interior of the second tubing in the second orientation of the fuel vent valve.

8. The vent valve of claim 7, wherein the second closable device blocks fluidic communication between the exterior of the second tubing and the interior of the second tubing in a third orientation of the fuel vent valve, and the first closable device allows fluidic communication between the exterior of the first tubing and the interior of the first tubing in the third orientation of the fuel vent valve.

9. The vent valve of claim 6, wherein the second inlet is substantially opposite the first inlet in the vent body.

10. The vent valve of claim 1, wherein the main closable device is a plunger, and further comprising a crash ball disposed within the main chamber, the plunger movable from the open position to the closed position by engagement of the crash ball with the plunger.

11. The fuel vent valve of claim 10, further comprising a screen enclosing a portion of the main chamber and the plunger and enclosing the crash ball within the main chamber.

12. The vent valve of claim 10, further comprising a spring configured to bias the plunger to the open position.

13. The vent valve of claim 1, wherein the vent body includes a first end having the outlet, and a second end opposite the first end, the fuel vent valve further comprising a float drain at the second end of the vent body.

14. A fuel tank comprising:
    a fuel tank body;
    a fuel vent valve fixed relative to the fuel tank body, the fuel vent valve disposed within an interior of the fuel tank body, the fuel vent valve comprising:
        a vent body including an outlet and at least one inlet;
        a main chamber within the vent body;
        a main closable device movable from an open position to allow fluidic communication between the main chamber and the outlet, to a closed position to block fluidic communication between the main chamber and the outlet; and, a first tubing having a first end and a second end, the first end connected to a first inlet amongst the at least one inlet, the second end spaced from the vent body, the first tubing further including a first closable device adjacent the second end, wherein the first closable device allows fluidic communication between the interior of the fuel tank and an interior of the first tubing in a first orientation of the fuel tank, and blocks fluidic communication between the interior of the fuel tank and the interior of the first tubing in a second orientation of the fuel tank; and, piping extended from the outlet of the vent body to an exterior of the fuel tank body;

wherein a portion of the main closable device extends within the piping, and the second end of the first tubing is disposed above a fill line of the fuel tank within the interior of the fuel tank body.

15. The fuel tank of claim 14, further comprising a second tubing having a first end and a second end, the first end of the second tubing connected to a second inlet amongst the at least one inlet, the second end of the second tubing spaced from the vent body, the second tubing further including a second closable device adjacent the second end of the second tubing, wherein the second closable device allows fluidic communication between the interior of the fuel tank and an interior of the second tubing in a first orientation of the fuel tank, and the second closable device allows fluidic communication between the interior of the fuel tank and the interior of the second tubing in the second orientation of the fuel tank.

16. The fuel tank of claim 15, wherein the second closable device blocks fluidic communication between the interior of the fuel tank and the interior of the second tubing in a third orientation of the fuel tank, and the first closable device allows fluidic communication between the interior of the fuel tank and the interior of the first tubing in the third orientation of the fuel tank.

17. A method of venting a fuel tank, the fuel tank having a fuel tank body, the method comprising:

securing a fuel vent valve within an interior of the fuel tank body, the fuel vent valve comprising a vent body including an outlet and at least one inlet; a main chamber within the vent body; a main closable device movable from an open position to allow fluid communication between the main chamber and the outlet, to a closed position to block fluidic communication between the main chamber and the outlet; and, a first tubing having a first end and a second end, the first end connected to a first inlet amongst the at least one inlet, the second end spaced from the vent body, the first tubing further including a first closable device adjacent the second end;

retaining the first closable device in an open position in a first orientation of the fuel tank to allow fluidic communication between the interior of the fuel tank and an interior of the first tubing; and, moving the first closable device to a closed position in a second orientation of the fuel tank to block fluidic communication between the interior of the fuel tank and the interior of the first tubing.

18. The method of claim 17, further comprising moving the main closable device to the closed position of the main closable device when the fuel tank is greater than 50 degrees from vertical.

19. The method of claim 17, wherein the fuel vent valve further comprises a second tubing having a first end and a second end, the first end of the second tubing connected to a second inlet amongst the at least one inlet, the second end of the second tubing spaced from the vent body, the second tubing further including a second closable device adjacent the second end of the second tubing, the method further comprising:

retaining the second closable device in an open position in the first orientation of the fuel tank to allow fluidic communication between the interior of the fuel tank and an interior of the second tubing; and, retaining the second closable device in the open position of the second closable device in the second orientation of the fuel tank to allow fluidic communication between the interior of the fuel tank and the interior of the second tubing.

20. The method of claim 19, further comprising:

moving the second closable device to a closed position in a third orientation of the fuel tank to block fluidic communication between the interior of the fuel tank and the interior of the second tubing; and, retaining the first closable device in the open position of the first closable device in the third orientation of the fuel tank to allow fluidic communication between the interior of the fuel tank and the interior of the first tubing.

* * * * *